(12) United States Patent
Sakai

(10) Patent No.: US 8,216,044 B1
(45) Date of Patent: Jul. 10, 2012

(54) METHOD AND APPARATUS FOR CALCULATING GAME OUTCOMES

(75) Inventor: Kaoru Sakai, Indianapolis, IN (US)

(73) Assignee: Kaoru Sakai, Indianapolis, IN (US)

( * ) Notice: Subject to any disclaimer, the term of this patent is extended or adjusted under 35 U.S.C. 154(b) by 622 days.

(21) Appl. No.: 12/334,994

(22) Filed: Dec. 15, 2008

(51) Int. Cl.
*A63F 9/24* (2006.01)
*A63F 13/00* (2006.01)

(52) U.S. Cl. ............... 463/16; 463/9; 463/22; 700/93

(58) Field of Classification Search ............ 463/9, 10, 463/12, 15, 16, 21, 22, 23; 700/91, 93
See application file for complete search history.

(56) References Cited

U.S. PATENT DOCUMENTS

| 6,209,873 | B1 | 4/2001 | DeGeorge | |
|---|---|---|---|---|
| 6,561,513 | B1 | 5/2003 | DeGeorge | |
| 2004/0235546 | A1* | 11/2004 | Ballard | 463/9 |
| 2005/0010313 | A1* | 1/2005 | Mori | 700/93 |

* cited by examiner

*Primary Examiner* — Julio J Maldonado
(74) *Attorney, Agent, or Firm* — Woodard, Emhardt, Moriarty, McNett & Henry LLP

(57) ABSTRACT

Among other things, methods and apparatus are disclosed relating to fairer and easier accurate calculations useful in games having tables of odds used to determine the outcome of a battle or other contest. Strength values for two sides are obtained, and calculations are made to determine which odds-value in the table should be used for the contest. If the values do not match with a particular odds-value, then probabilities for using the nearest odds-values can be generated so that the player(s) can determine themselves which odds-value to use, or a random number can be generated to automatically determine which odds-value to use.

20 Claims, 4 Drawing Sheets

METHOD AND APPARATUS FOR CALCULATING GAME OUTCOMES

The present disclosure is directed to methods and apparatus for calculating game outcomes, e.g. outcomes of a simulated battle in a war game. More specifically, it concerns the calculation of outcomes on a more fair basis in light of the relative strengths of the opposing sides, without the rounding that is generally used.

BACKGROUND

There are a number of table or role-playing games in which the outcome of a battle or other contest is determined by comparing the relative strengths of the sides, referring to a table of odds according to the rules of the game, and creating a random number (e.g. by rolling one or more dice). For example, in battle games such as Panzer Leader or Kingmaker, a combat table is provided listing an array of odds from 1-4 (one to four) to 4-1 (four to one) on one axis, and an array of die rolls on the other axis. Given an odds number and a die roll, the outcome of the battle can be read from the appropriate cell of the table. In a battle situation, the respective strengths of the attacking force and the defending force are determined, and the ratio of the attacking strength to the defending strength is calculated. If that ratio matches one of the ratios in the combat table, then a roll can be made and the outcome found in the table.

If, however, the actual ratio in the given battle does not match a ratio in the table, then game rules round the actual ratio down to a ratio in the table. Thus, if the value of the offensive strength is 11 and the value of the defensive strength is 10, the ratio of offensive strength to defensive strength is 11/10, or 1.1. Given a table that includes columns for odds of 1-2, 1-1, and 2-1 (and perhaps larger or smaller, but not intermediate odds), the actual ratio of 1.1 (e.g., 1.1 to 1 or 11 to 10) is not in the table. The actual ratio is then rounded down to 1 to 1, which is an odds-value given in the table. The full offensive strength is therefore ignored in calculating the outcome of the battle. A more lopsided result obtains where the offensive strength-value is 19 and the defensive strength-value is 10. The actual ratio in such a case is 19/10 or 1.9, but by rounding down the odds-value in the combat table that is used remains 1-1. A single unit of defensive strength thus can have an inordinate effect simply due to the limitations of the combat table.

Further, it can be time-consuming to go through the calculation and comparison of these strength-value ratios, whether on paper or in one's head, many times during a game session, especially if some odds-value ratios in a table are not simple (e.g., 5 to 4, 3 to 2, etc.). For each battle, a ratio in the form of a fraction or decimal must be calculated, and then compared to a discrete set of odds. The odds must be considered as fractions (e.g., two to one is equivalent to 2/1 or 2, while one to two is equivalent to 1/2), and then the ratio of strengths is compared to those "fractionalized" odds. The odds to be used are the set next lower than the ratio of strengths. While an occupational hazard of participating in such games, the time and mental agility required to compare such fractions can be substantial.

Accordingly, fairer and/or easier ways to determine the outcome of battles or other odds-dependent issues in games are desirable.

SUMMARY

Among other things, there is disclosed an apparatus having a programmable device with a processor electronically linked to programmable memory, a display and an input, such that the memory has stored therein an array of data reflecting a set of odds-values used in determining an outcome between a first side having a first strength value and a second side having a second strength value in a game. The memory further has storage for accepting a first inputted number as the first strength value and a second inputted number as a second strength value, and a set of instructions callable by said processor. The instructions may include determining whether the ratio of the first strength value to the second strength value is between a relatively higher odds-value and a relatively lower odds-value of the set of odds-values, determining a closeness factor reflecting the closeness of the ratio of the first strength value to the second strength value to one of the two surrounding odds-values, and outputting to the display one of the two odds-values.

The odds-value outputted to the display can be part of a decimal probability indicator having no fewer than two digits to the left of the decimal indicating the odds-value, and a plurality of digits to the right of the decimal indicating a set of values for comparison to respective random numbers. If a random number is less than a respective digit to the right of the decimal in the set of values, then the lesser of the two odds-values is used in the game to determine the outcome, and if a random number is greater than that respective digit in the set of values the greater of the two odds-values is used in the game to determine the outcome. If a random number is equal to that respective digit in the set of values then a new random number is compared to the next digit in the set of values. The instructions in memory can also include calculations to determine said decimal probability indicator. They may also include generation of a random number by the processor and comparing the random number to the closeness factor. When the random number is less than the closeness factor, the relatively lower odds-value is the outputted odds-value, and when the random number is greater than the closeness factor, the relatively higher odds-value is the outputted odds-value. The instructions may also include testing the ratio to see if it is above the largest of the set of odds-values, below the smallest of the set of odds-values, or equal to an odds-value in the set of odds-values.

Methods are also disclosed, including a method of calculating an outcome between a first side and a second side in a game in which an odds table including a set of discrete odds-values is provided for such outcome. Such a method may include determining a strength value for the first side and a strength value for the second side, and finding a particular one of the odds-values using the strength values. If the ratio of the strength values is equivalent to an odds-value in the odds table, the finding includes choosing the odds-value equivalent to the ratio as the particular odds-value. If the ratio is numerically between a first and second of the odds-values, the finding includes determining closeness factor reflecting the nearness of the ratio to one of the first and second odds-values, generating a random number, and comparing the random number to the closeness factor. When the random number is less than the closeness factor the first odds-value is the particular odds-value, and when the random number is greater than the closeness factor the second odds-value is the particular odds-value.

In such methods, the calculating and finding may be performed by a programmable device having a processor electronically linked to memory, and may further include inputting the strength values to the memory. The inputting may be performed manually, and the memory can be pre-programmed with an array of data reflecting the set of discrete odds-values. Further methods can use the odds-value that has been indicated for use in the game to determine an outcome. The processor may be electronically connected to a display, and if so methods can include outputting the particular odds-value to the display.

A method of calculating an outcome between a first side and a second side in a game in which an odds table including a set of discrete odds-values is provided for such outcome includes inputting a first strength value representing the first side and a second strength value representing the second side into a programmable memory that is electronically connected to a display and a processor; using the processor to calculate a third value from the first and second strength values, the third value representing one of the odds-values from the odds table and a set of probability factors; and displaying the third value on the display. The memory may be pre-programmed with an array representing the discrete odds-values. In some embodiments, the third value is a decimal having no fewer than two digits to the left of the decimal that are the representation of the one of the odds-values from the odds table, and a plurality of digits to the right of the decimal that are the set of probability factors.

There may be a second odds-value higher than the one of the odds-values from the odds table, so that methods can include obtaining a random number and comparing it to the first digit to the right of the decimal. If the random number is less than that first digit then the one of the odds-values from the odds table is chosen for use in calculating the outcome. If the random number is greater than the first digit then the second odds-value is chosen for use in calculating the outcome. If the random number is equal to the first digit, then a new random number is generated and compared in the same way to the next of the digits to the right of the decimal, and the obtaining and comparing is repeated until either the one odds-value or the second odds-value is chosen. In such methods, the plurality of digits to the right of the decimal may each have values of six or less, and the obtaining a random number includes rolling a six-sided die. Further, the using step may include testing the first and second strength values to see if the ratio between them is equal to one of the odds-values, and if so, the third value is an integer of no fewer than two digits representing that one of the odds-values.

In other embodiments, instead of each outcome being an independent event, a running total of the plurality of digits is maintained for each participant involved. When said total exceeds unity, the applicable outcome is awarded the higher of the discrete odds-values for that outcome instance only and the running total is reduced by unity. By this procedure, the excess strength units will be preserved and will be used at some future time. The order that the players use to determine the outcomes will dictate when the higher of the discrete odds-values can be used to their respective advantages.

DETAILED DESCRIPTION

Figure 1:
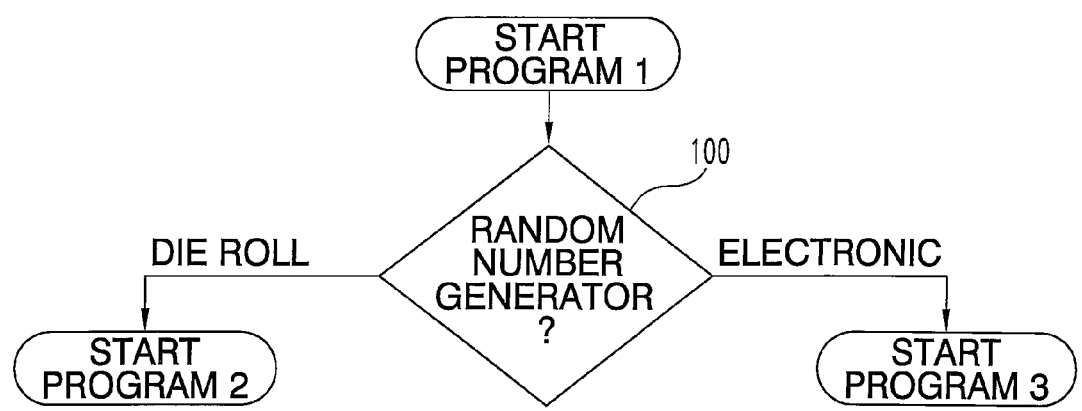
FIG. 1 is a flow chart representing disclosed embodiments of steps programmed into memory for performing methods disclosed herein, particularly choosing between determinative or non-determinative embodiments of methods.
Figure 2:
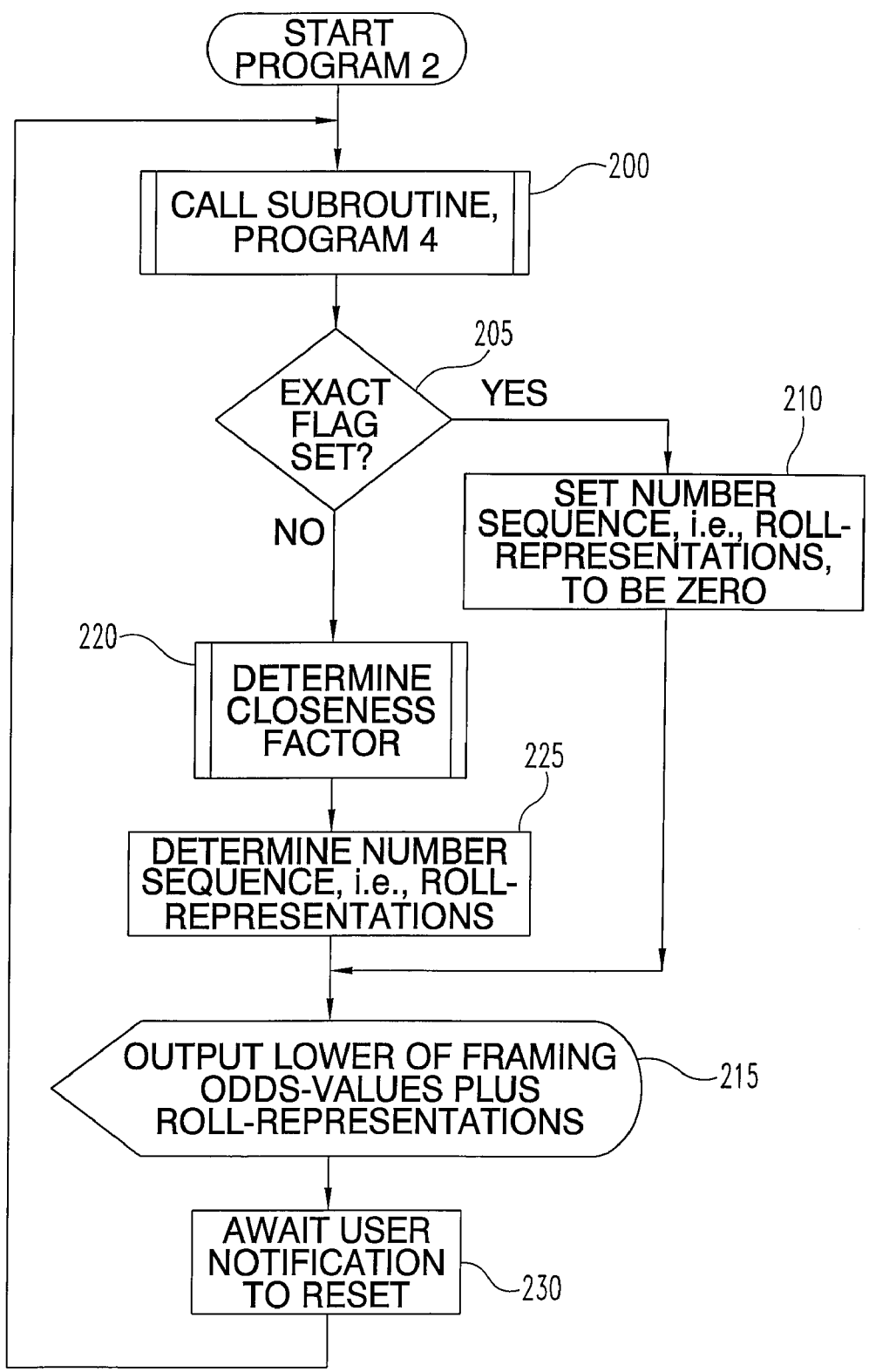
FIG. 2 is a flow chart representing disclosed embodiments of steps programmed into memory for performing methods disclosed herein, particularly determining a set of roll-representations.
Figure 3:
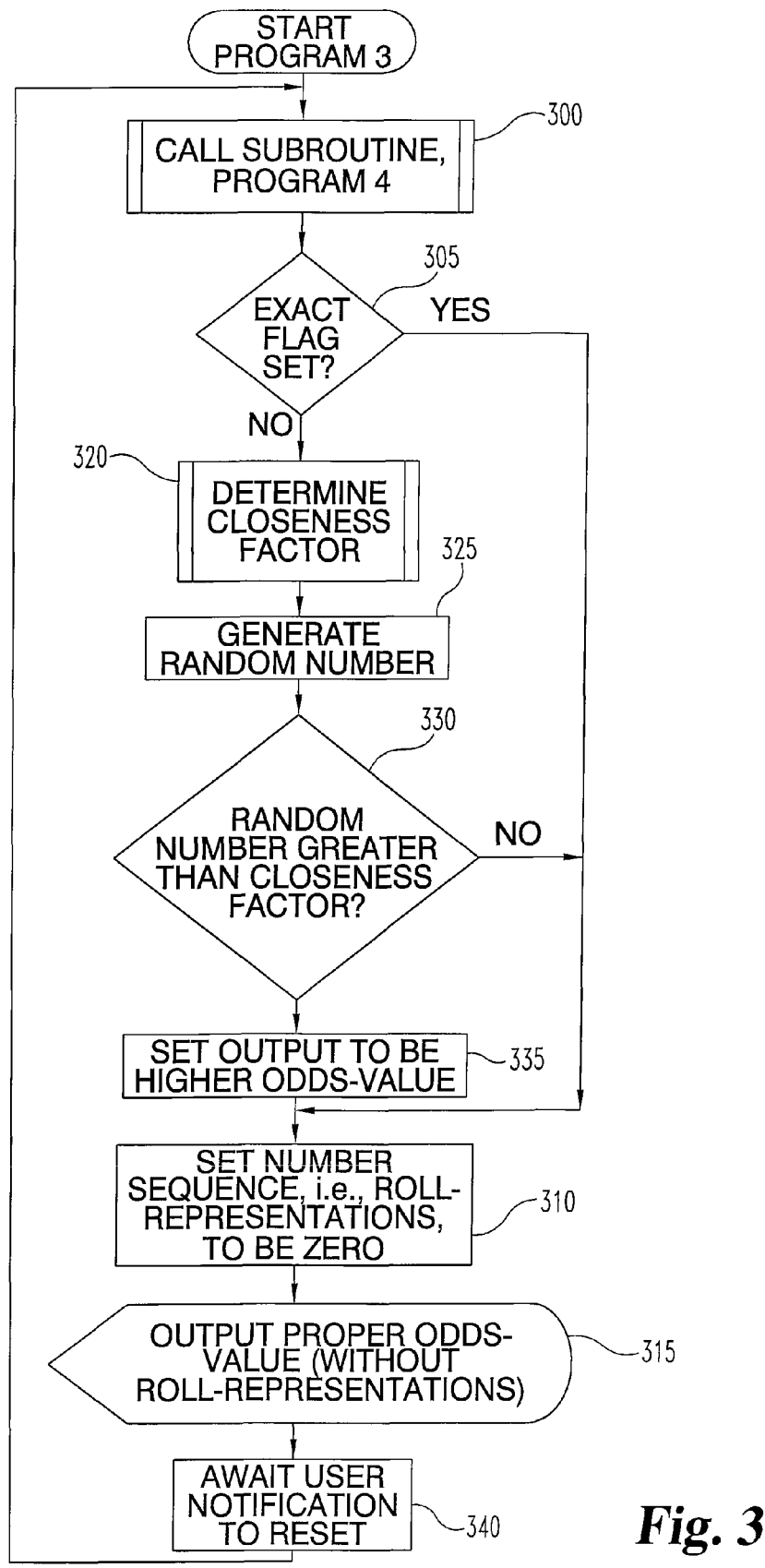
FIG. 3 is a flow chart representing disclosed embodiments of steps programmed into memory for performing methods disclosed herein, particularly determining a specific odds-value for use.
Figure 4:
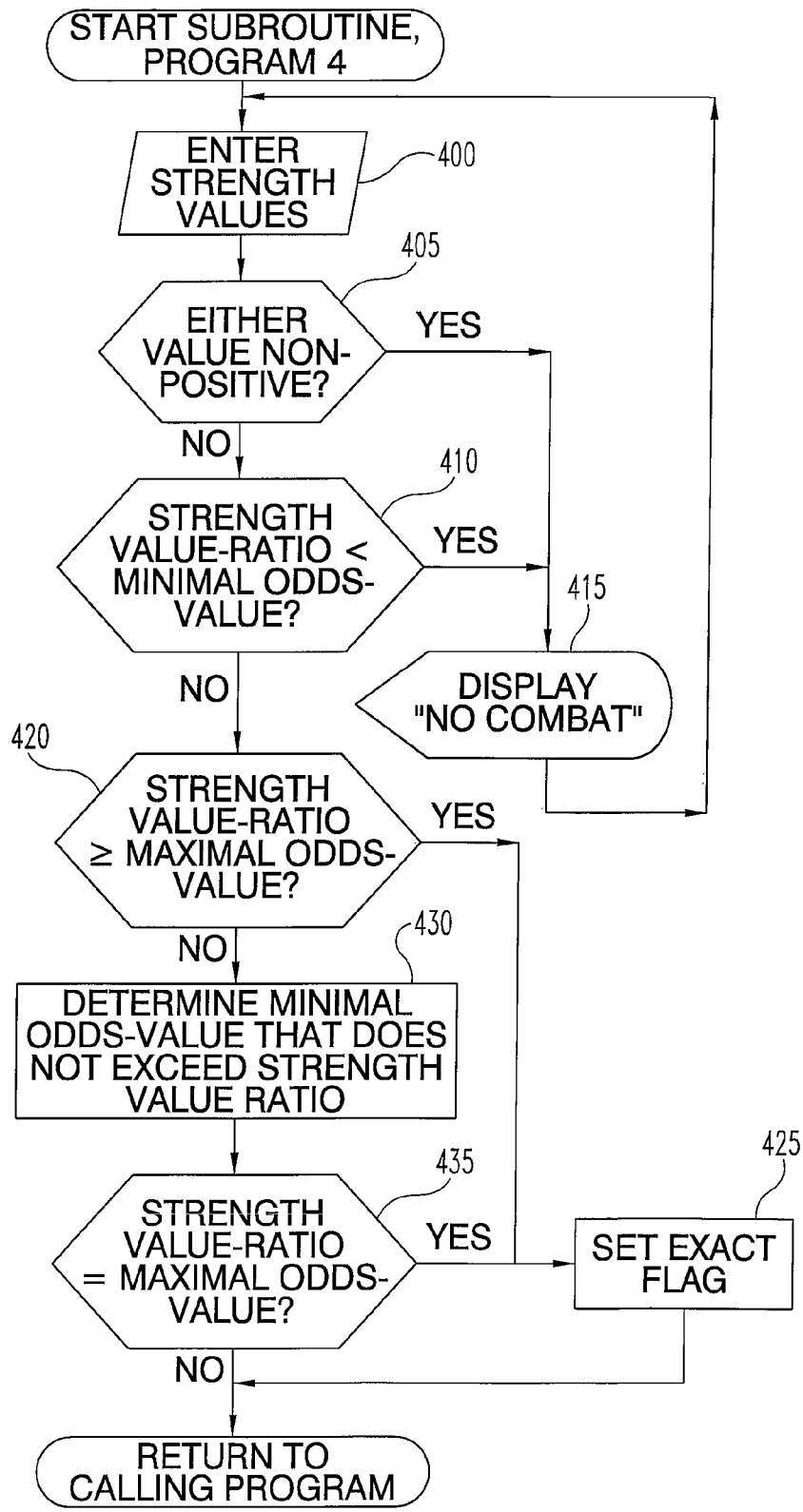
FIG. 4 is a flow chart representing disclosed embodiments of steps programmed into memory for performing methods disclosed herein, particularly testing input values.

For the purposes of promoting an understanding of the principles of the disclosure, reference will now be made to the embodiment illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

Referring generally to the Figures and the description below, there are disclosed embodiments of methods to determine the odds to be used in a battle or other contest in a game, which account for the entire strength values of the contesting sides. When incorporated into an electronic processor having memory, the device makes figuring the needed ratios and calculations fairer and easier while ensuring calculation accuracy.

Of course, there are cases in which the relationship between offensive strength and defensive strength is easily figured and corresponds exactly to an odds-value in the game's table. In most cases, however, the ratio obtained from the calculated strength-values of the two sides ("strength-value ratio") is not an integer or an easy fraction to reduce or compare to odds-values in a game's table, much less exactly equivalent to one of those odds-values. In that case, the methods disclosed herein provide a unique way to determine on a probability basis which odds-value in the table to use.

Generally speaking, in a case in which the strength-value ratio is greater than the highest odds-value in the table, then the column for the highest odds-value in the table is used. In a case in which the strength-value ratio is between two odds-values in the table (a "lower odds-value" and an "upper odds-value"), the strength-value ratio is converted to a number reflecting a probability indicating the likelihood of using one or the other of the odds-values. In a simplest case, the strength-value ratio stated as a decimal is read as a probability, with the number to the left of the decimal point indicating the lower odds-value, and the number(s) to the right of the decimal point indicating the chance of using the upper odds-value. For example, where the offensive strength is 19 and the defensive strength is 10, the strength-value ratio is 19/10, and converted to a decimal is expressible as 1.9. The lower odds-value in that case is represented by the 1 to the left of the decimal point (i.e. 1 to 1 odds), and there is a nine-out-of-ten chance that the upper odds-value (i.e., 2 to 1 provided no odds-value in the table between 1 to 1 and 2 to 1 exists) should be used. A random probability number is then generated to see whether the upper odds-value or the lower odds-value is to be used. In the example given above, the lower odds-value is 1 to 1, the upper odds-value is 2 to 1, and the probability of using the upper odds-value is 90 percent (nine out of ten). A ten-sided die (having the numbers 0-9, for example) may be used to generate a random probability number for the final determination of which odds-value column in the table is to be used. For instance, if a zero on the ten-sided die is rolled, then the lower odds-value (1 to 1 in the above example) is used to complete the battle or contest, while if any other number is rolled, then the upper odds-value (2 to 1 in the above example) is used.

Other types of random-number generation can be used to generate the probability number, such as a six-sided die or electronic generation. With an electronic random-number generation system, a request for a random number among ten (e.g. from zero to nine) is made. If the result is one predetermined number, such as zero, then the lower odds-value is used, while if the result is any other number, the upper odds-value is used.

However, how to use a common six-sided die to reflect a nine-tenths probability (as in the above example), and of course more difficult strength-value ratios (such as those having seven, eleven, thirteen or other defensive strength-values as a denominator), present substantial challenges in determining the framing odds-values, computing a probability of using one or the other of those odds-values, and obtaining random numbers to decide which odds-value to use. It should be mentioned that this description is tailored to the six-sided die but may be modified to accommodate any randomizing device/concept. The methods noted herein may be performed manually or partially or completely electronically. An electronic embodiment can include an electronic processor with memory programmed to accept inputs of offensive strength and defensive strength. The processor can also be programmed to request instruction as to whether it should generate a random number and tell the user which odds-value column to use, or whether it should merely provide a number or series of numbers to be rolled by the user. It has been found that a programmable calculator can be programmed and used to perform the methods herein, although it is understood that more sophisticated electronic processors and memory (e.g. personal computer-based) could also be used. Such methods may also be incorporated into platforms (software or hardware) for video games to provide probabilities for outcomes.

As an example of features of this disclosure, a Sentry Industries CA 756 programmable calculator was programmed to perform the below-discussed example of the disclosed methods. Data reflecting the odds-values of a particular game's combat table (Panzer Leader, in this case) were entered in sequentially increasing order into memory. An n-by-2 data array is created in memory, with n being the number of odds-values in the game's combat table. Thus, there are n groups of two values each, and each group reflects an odds-value in the game's combat table, as by having its first number be the attacking strength expressed as an integer of the odds-value and its second number be the relatively prime defending strength expressed as an integer of the odds-value. Consequently, in a game (like Panzer Leader) that has the seven odds-values of 1 to 4, 1 to 3, 1 to 2, 1 to 1, 2 to 1, 3 to 1, and 4 to 1, the array is 7-by-2. For example, the first group may be 1 and 4, reflecting the 1 to 4 odds-value, the second group may be 1 and 3, reflecting the 1 to 3 odds-value, and so on. Each of the two values in a group is individually accessible for later calculations. With that array, a series of six connected sub-programs or subroutines were entered into memory, all by hand. See the example below. It was discovered that the Sentry Industries CA 756 had sufficient memory to be able to handle all of the programming and the keystrokes necessary to create it for a game such as Panzer Leader which contains no more than nine odds-values in its table including the operations below.

Program 1 enables the user to choose one of two different programs (Programs 2 and 3 in the example below), either of which may be initially called by the user by inputting which of the two primary programs he or she desires. One of those programs (a "non-determinative program") is used if the user wishes to use an outside random number-generator (e.g., he or she wishes to roll dice). The other of those programs (a "determinative program") is used if the user wishes to have the processor generate the random number that determines which odds-value column to use. As noted, the processor initially offers the user a choice, as at block 100, and the input provided by the user directs the processor to either the non-determinative or the determinative program.

Independent of which program is selected, it begins operating by calling a subroutine (as at blocks 200 and 300) that requests and accepts input of the offensive and defensive strength-values, as at block 400. The values are tested to see if either is non-positive and if the offensive strength to defensive strength ratio is less than the lowest allowable odds-value, as at blocks 405 and 410. If either value is non-positive, or if the strength value ratio fails the above test, then the subroutine displays a message such as NO COMBAT as at block 415, indicating that there can be no combat with the inputted values. The subroutine makes a new request for new values, and the above testing is repeated. When appropriate strength-values have been inputted, this subroutine then tests to see if the ratio is equal to or larger than the maximum odds, as at block 420, and if so, it sets the exact odds-value flag for use by the player, as at block 425.

If the ratio is between the maximum and minimum odds-values, and thus either equal to one odds-value or between two discrete odds-values, then a series of comparisons is made to determine the maximal odds-value that does not exceed the strength value ratio (as at block 430), via the following procedure. The processor calls the values from the n-by-2 array in memory that reflect the second-lowest odds-value (for example, 1 to 3), one value that relates to the offensive strength (e.g. 1 in this instance) and one value that relates to the defensive strength (e.g. 3 in this instance). The second-lowest odds-value is chosen because the processor has previously determined that the ratio is above the lowest odds-value, as discussed above. The offensive strength-value is multiplied by its related factor from the array and the defensive strength-value is multiplied by its related factor from the array. The use of products for the purpose of comparison was chosen since the input strength values are typically integers or convenient mixed fractions with small denominators, the odds-values are stored as integers and the potential for round off errors due to microprocessor data resolution would be minimized. If that offensive-strength-product is less than that defensive-strength-product, then the ratio is between the lowest odds-value and the second lowest odds-value. If not, then the processor calls two new values from the n-by-2 array in memory that reflect the next-higher odds-value (for example, the numbers 1 and 2 reflecting the odds-value 1 to 2). As before, the offensive strength-value is multiplied by its related factor from the array and the defensive strength-value by its related factor from the array, and the products are compared. Again, if the offensive-strength-product is less than the defensive-strength-product, then the ratio is between the next-higher odds-value and the odds-value immediately beneath it. These steps are repeated until the two odds-values surrounding the strength-value ratio have been identified. At that point, a value indicating the group from the array that represents the lower of the odds-values that frame the ratio is stored to memory. For example, if the above processing determines that the ratio is between 1 to 1 and 2 to 1, then a value is stored to memory that represents the group in the array that includes the respective values 1 and 1. That stored value may reflect the place in the array of the first value. In the case of 1 to 1 in an array reflecting Panzer Leader odds-values noted above, the first "1" is in the seventh place, there being three groups of two values (reflecting 1 to 4, 1 to 3 and 1 to 2) ahead of it. Thus, where the places are counted beginning with zero as is commonplace, the value "6" is stored to represent the group reflecting the odds-value of 1 to 1 as the lower of the two odds-values that frame the ratio. To complete the subroutine, the strength-value ratio is checked for equality to the determined odds-value (as at block 435); if they are equal, the exact flag is set (as at block 425).

Once that input and testing subroutine is complete, the processor returns to the calling program. Each program then checks whether the exact flag was set (as at blocks 205 and 305). If that is the case, enough information has been provided for an output. The roll representation is set to zero (as at blocks 210 and 310), signifying that only the odds-value be displayed. A final calculation is performed to place the information in a readable format for output. For example, the first value in the odds-value (i.e. the first number of the appropriate group in the array) is multiplied by 10 and the product is added to the second value in the odds-value, giving a number with no fewer than two digits reflecting the odds-value (e.g., "21" represents 2 to 1, "11" represents 1 to 1, etc.). That information is outputted, as at blocks 215 or 315, to the user for his or her use in handling the battle after preparing the display in the proper format (as in blocks 210 and 310). If the ratio is not equal to a particular odds-value then a subroutine (Program 5 below) is called to provide a value ("closeness factor") indicating how close the ratio is to the higher of the two odds-values that frame the ratio, as at blocks 220 and 320. The two formulas for determining the closeness factor are quite similar, and so the one for use when the offensive strength is greater than the defensive strength will be described below.

This closeness factor uses three pieces of information—the ratio of offensive strength to defensive strength, the lower of the two framing odds-values (expressed as a fraction or decimal) and the upper of the two framing odds-values (also expressed as a fraction or decimal). The difference between the strength value ratio and the lower odds-value is divided by the difference between the upper odds-value and the lower odds-value, and the resulting fraction represents the relative closeness to the upper odds-value and is saved. For example, if the resulting fraction is ½, then the ratio is exactly halfway between the upper and lower odds-value. If the resulting fraction is ¾, then the ratio is three-quarters of the way from the lower odds-value to the upper odds-value.

In cases where the offensive strength is less than the defensive strength, reciprocals are used in the calculation noted above. Thus, the ratio used is defensive strength to offensive strength (rather than offensive strength to defensive strength) and the reciprocals of the odds-values that frame the ratio are also used. The difference between the ratio (defensive to offensive) and the reciprocal of the lower odds-value is divided by the difference between the reciprocal of the upper odds-value and the reciprocal of the lower odds-value, and the resulting fraction represents the relative closeness to the upper odds-value and is saved.

After the appropriate closeness factor has been calculated, the subroutine terminates, returning to the calling program. At this point, the calling programs differ and will be described individually. The non-determinative program will be detailed first.

The closeness factor, that fraction representing the closeness to the upper odds-value, is used in a calculation loop to determine a number representing a set of rolls on a six-sided die that can be used to decide which odds-value to use in the battle, as at block 225. The closeness fraction is multiplied by six and the whole-number portion of the resulting product (the "Int" function) is obtained (an integer between 0 and 5 inclusive). That result is subtracted from six and the resulting difference is multiplied by 0.1 (i.e., 10 to the negative power of the number of iterations, here 1), resulting in a first value (0.1 through 0.6) indicating a target number for a first roll. The fractional portion of the product noted above (the closeness fraction multiplied by six) is retained as a new closeness ratio, a counter is decreased, and a new (second) iteration of the calculation is performed. The second iteration is the same as the first, with the new closeness ratio multiplied by six and the whole-number portion of that product is obtained. That result is subtracted from six and the resulting difference is multiplied by 0.01 (i.e. 10 to the negative power of the number of iterations, in this case 2), resulting in a second value (0.01 through 0.06) indicating a target number for a second roll. The first and second values are added, resulting in a number with two digits to the right of the decimal, and retained. The fractional portion of the product of the new closeness factor is retained as the new closeness factor (for a third iteration), a counter is decreased, and a new (third) iteration is performed. In one embodiment, eight iterations are performed, generating a number (through adding together the decimal results) with eight digits to the right of the decimal point to represent a sequence of target numbers for rolls of a die. Although this sequence is probably most properly called "offset heximal," the term decimal will be used for this description. It will be seen that values to other numbers of decimal places can be used.

Once that eight-digit (or other length) decimal is obtained, it is added to a number reflecting the lower of the two odds-values that frame the offensive to defensive ratio. As noted above, a reference number has been maintained throughout the calculation from which each number of the framing odds-values can be located from the n-by-2 array in memory. That reference number is used to obtain the first and second numbers for the lower odds-value from the array. The first number is multiplied by 10, and that product is added to that second number and to the decimal number to provide a final readout. This concept was described previously for the set exact flag case where no fractional component was to be displayed. For example, if the reference number relates to a lower odds-value of 1 to 1, then both the first and second numbers from memory are 1. The first "1" is multiplied by 10, and is then added to the second "1" and the eight-digit decimal, and the sum is outputted to the user, as in block 215.

In this way, the number 11.36666666 is outputted, when an offensive strength of 15 and a defensive strength of 10 are inputted. In that example, the digits to the left of the decimal reflect that the lower odds-value is 1 to 1 and the next higher odds-value is 2 to 1. The eight digits to the right of the decimal express a list of six-sided die rolls (or other random choices of the numbers 1 through 6) in sequence. In the above example, the first listed digit is 3. If a one or two is rolled on the first roll, then the lower odds-value (1 to 1) is used, while if four, five or six is rolled on the first roll, then the upper odds-value (2 to 1) is used. If a three is rolled, then one proceeds to the next digit for the next roll. Once again, if the roll is less than the digit then the lower odds-value is used, if the roll is greater than the digit then the upper odds-value is used, and if the roll is equal to the digit then one proceed to the next digit. However, in the example given immediately above, since all of the remaining digits are 6, and one cannot roll higher than a six, eventually one will roll less than a six and use the lower odds-value. Thus, the result in this example is that if a one, two or three is initially rolled, the lower odds-value is used, while a four, five or six means the use of the upper odds-value. In other words, for an offensive strength of 15 and a defensive strength of 10, the probability is fifty percent each way of using the upper and lower odds-values, as might be expected because the strength-value ratio is exactly halfway between the framing odds-values.

Additionally, the random number(s) determining which odds-value to use can also be generated electronically. In one embodiment, following a method similar or identical to that described above, one or more requests for a random number can be made. If the requests are for a random number between 1 and 6 inclusive, then each successive requested number can be compared to the appropriate digit in the outputted decimal number. As noted above, if the random number is below the appropriate digit in the decimal number, then the lower odds-value is used, while if it is above the appropriate digit in the decimal number, the upper odds-value is used. If the random number is equal to the appropriate digit, then a new random number is generated and compared to the next digit in the decimal number, and so on.

In other embodiments, a determinative program (as noted above) bypasses the calculations discussed above involved in generating a decimal that reflects a list of six-sided die rolls or similar random values. The case where the exact flag was set has already been described and so the case where the strength value ratio is not represented in the odds-value groups must be addressed.

If the ratio is between two odds-values, then the appropriate subroutine is called to determine a closeness factor, as discussed above and as indicated in block 320. With that closeness factor in memory, a fractional or decimal random number between zero and one is generated as at block 325. The random number is compared to the closeness factor as at block 330. If the random number is greater than the closeness factor, then the lower odds-value is to be used and an integer of no fewer than two digits is created (as discussed above) to reflect that value (e.g., "11" reflects 1 to 1) and outputted as at block 315. If the random number is not greater than the closeness factor, then the upper odds-value is to be used, and an integer of no fewer than two digits is created to reflect that value as set at block 335 and outputted as block 315. In particular embodiments, an initial random number between zero and one and having three digits to the right of the decimal point is generated. A second such random number is generated, divided by 1,000, and added to the first random number, creating a random number between zero and one and with six digits to the right of the decimal point. Other methods can be used to generate a random decimal number, but the above steps were determined to be effective on the Sentry CA 756 programmable calculator noted above.

With either a non-determinative or a determinative program, once an output is obtained (as at blocks 215 or 315) the processor can automatically reset and become ready for a new calculation, or can wait for the user to press a button or make an entry to reset it for a new calculation, as at blocks 230 and 340. With such a reset, the processor then waits for input for the next battle or contest, by executing block 200 or 300.

In these ways, a particular odds-value to be used for a given pair of strength-values is obtained. The particular odds-value is more reflective of the actual strength-values than the automatic rounding-down procedure noted above. Once the particular odds-value to be used for the battle is determined, the user proceeds to use that value in the battle as a part of regular play of the game. If an electronic device with memory is used, the device might automatically reset itself after time or the user can reset the device after the odds-value has been utilized to ready it for a new calculation.

Another method of determining a particular odds-value that is more representative of actual strengths than the common rounding-down procedure is to keep a running sum of each fractional part of the strength-value ratio, and adding that running sum to subsequent strength-value ratios to determine which of two odds-value columns in a table to use. For example, if a first battle or contest involves an offensive strength of 13 and a defensive strength of 10, then the strength-value ratio is 13/10 or 1.3 in decimal form. Assume a table as above, which includes odds-values of 1 to 4, 1 to 3, 1 to 2, 1 to 1, 2 to 1, 3 to 1, and 4 to 1. For that first battle or contest in which the strength-value ratio is 1.3, the 1 to 1 odds-value column is used based on the number 1 to the left of the decimal. The fractional part of that strength-value ratio (0.3 in this example) is ignored for the first battle, but is kept aside for later use. When the next battle or contest comes around, the fractional remainders are combined. Thus, for example, if a second battle or contest has a strength-value ratio of 1.2, then, as with the first battle, the 1 to 1 odds-value column is specified based on the number 1 to the left of the decimal point. Since the sum of the fractional reminders (now 0.5) is less than unity, the 1 to 1 odds-value column is to be used for this battle or contest. This procedure is repeated throughout the game. Assume a next battle has an initial strength-value ratio of 1.6, making the raw odds-value 1 to 1 with a remainder of 0.6. Upon adding the fractional remainder of 0.5 from previous outcomes, a new fractional remainder of 1.1 is obtained. That sum would result in a shift up to the 2 to 1 odds-value column, for this battle or contest, and the fractional remainder of 0.1 would be kept for the next battle or contest. Thus, the memory of the programmable calculator or other device can include set storage or other locations that retain a running total of one or more closeness factors (e.g. the fractional part of the strength-value ratio noted above) that have been previously determined. When the total exceeds unity, the relatively higher odds-value is outputted, and if the total is less than unity, the relatively lower odds-value is outputted.

EXAMPLE 1

A particular example of code used in the Sentry CA 756 programmable calculator to perform an embodiment of the methods disclosed herein is given. The following is a listing of instructions, by keystrokes. This example has been tested and found to operate as desired.

Program Choice (Program 1; allows user to select desired program)

| Keystrokes | Comments |
| --- | --- |
| "I ROLL=1"?→ Z: | User inputs 1 for determinative program, anything else for non-determinative program. |
| Z=1 ⇒Prog 3: | User input 1. Run Program 3. |
| Prog 2: | User input number not equal to 1. Run Program 2. |

Non-Determinative Program (Program 2; output allows player to make own rolls on six-sided die)

| Keystrokes | Comments |
| --- | --- |
| Lbl 0: Prog 4: | Call Subroutine 4 to get offensive/defensive strength values. |
| U=1 ⇒Goto 2: | Exact Flag set so the output display does not include digits to the right of the decimal point. |

| Keystrokes | | Comments |
|---|---|---|
| | Prog 5: | Calls Subroutine 5 to determine closeness ratio. |
| | 0→Z: | "Z" variable changed for use in compiling sequence of rolls. |
| | 8→Y: | "Y" variable changed to track sequence of roll calculations. |
| Lbl 1: | 6×X→X: | The "X" resulting from Subroutine 5 is multiplied by 6 and the product is assigned to X, toward next number in sequence of rolls. |
| | Z+(6-Int X)×10^(Y-9) →Z | The next number in the roll sequence is given by 6-INT X, and it is assigned a decimal place via Y; Z accumulates the decimalized roll numbers. |
| | Frac X→X: | Retains the fractional part of 6×X as the new X. |
| | Dsz Y: | Decreases counter (Y) by one; if Y=0, then skip next line. |
| | Goto 1: | Returns to Label 1. |
| | Goto 3: | Arrives here when Y=0, prepares for display. |
| Lbl 2: | 0→Z: | Arrives here when the highest odds-value is assured or there is exact match in odds-value, so no roll sequence is needed. |
| Lbl 3: | Prog 6: | Calls Subroutine 6 for displaying result. |
| | Goto 0 | Return to top for next calculation. |

Determinative Program (Program 3; generates random number, gives odds-column; no player dice rolling)

| Keystrokes | | Comments |
|---|---|---|
| Lbl 0: | Prog 4: | Call Subroutine 4 to get offensive/defensive strength values. |
| | U=1 ⇒Goto 1: | Exact Flag set so no random number is needed. |
| | Prog 5: | Calls Subroutine 5 to determine closeness ratio. |
| | Ran#◢: | Generates random number from 0.000 to 0.999 ("◢" keeps the random number from repeating in the following line). |
| | Ans+Ran#/1E3≦X ⇒W+2→W: | To the random number is added a second random number from 0.000 to 0.999 divided by 1,000, giving a random value to six decimal digits; if the random number is not higher than the closeness ratio, then use the higher of the two framing odds-values. |
| Lbl 1: | 0→Z: | No digit to the right of the decimal point is to be displayed. |
| | Prog 6: | Call Subroutine for displaying result. |
| | Goto 0 | Return to top for next calculation. |

Input Subroutine (Program 4; accepts and tests strength values)

| Keystrokes | | Comments |
|---|---|---|
| | 0→W: | Initializes W, used to determine the lower of the framing odds-values. |
| Lbl 0: | "ATT"? →Z: | Requests and allows entry of offensive strength value. |
| | "DEF"? →Y: | Requests and allows entry of defensive strength value. |
| | Z≦0 ⇒Goto 1: | |
| | Y≦0 ⇒Goto 1: | If either Y or Z is nonpositive display "NO COMBAT" |
| | Z×B≧Y×A ⇒Goto 2: | If Z×B is less than Y×A then the strength value is less than minimal odds-value. |
| Lbl 1: | "NO COMBAT"◢: | Displays impossibility of combat with given values. |
| | Goto 0: | Returns for new values. |
| Lbl 2: | A[W+2]=0 ⇒Goto 4: | If strength values give ratio above maximum, go to Label 4. |
| | Z×A[W+3]<Y×A[W+2]Goto 3: | If comparison is true, then ratio of strength values is between A[W]/A[W+1] and A[W+2]/A[W+3], and proceed to Label 3; otherwise we need to compare higher odds-value. |
| | W+2→W: | W is stepped up to reflect next group in the array. |
| | Goto 2: | Returns for analysis with the new value of W. |
| Lbl 3: | Z×A[W+1]=Y×A[W]⇒ Goto 4: | If this is true, the strength-value ratio matches an odds-value so set Exact Flag at Label 4. |
| | A[W]/A[W+1]→X: | The correct framing odds-value has been found (i.e., the lower framing odds-value is A[W]/A[W+1]), and that odds-value is saved to the variable X. |
| | A[W+2]/A[W+3]→V: | The upper framing odds-value is A[W+2]/A[W+3] and that odds-value is saved to the variable V. This is a keystroke saver, preserving program memory. |
| | Goto 5: | Subroutine operation complete. Go to subroutine termination. |
| Lbl 4: | 1→U: | Set Exact Flag. |
| Lbl 5 | | Return to calling program. |

Closeness Ratio Subroutine (Program 5; determines closeness ratio)

| Keystrokes | | Comments |
|---|---|---|
| | Z>Y⇒ Goto 0: | If the offensive is greater than the defensive strength value, then go to Label 0. |
| | (Y/Z-1/X)/(1/V-1/X)→X: | The ratio of defensive to offensive strength (Y/Z), less the reciprocal of X, is divided by an odds-value reciprocal of V less the reciprocal of X, giving a number between 0 and 1 that represents how close to the upper odds-value the strength values ratio is; the nearer the closeness ratio is to 1, the nearer the strength values ratio is to the upper odds-value. |
| | Goto 1: | Closeness ratio calculated for defensive strength value less than or equal to offensive strength value. Go to subroutine termination. |
| Lbl 0: | (Z/Y-X)/(V-X)→X: | The ratio of offensive to defensive strength (Z/Y), less X, is divided by the upper odds-value V less X, giving a number between 0 and 1 that represents how close to the upper odds-value the strength values ratio is; the nearer |

-continued

| Keystrokes | Comments |
| --- | --- |
|  | the closeness ratio is to 1, the nearer the strength values ratio is to the upper odds-value. |
| Lbl 1 | Return to calling program. |

Output Display Subroutine (Program 6; provides integer corresponding to table odds-value plus roll sequence if non-determinative program was selected and exact flag was not set)

| Keystrokes | Comments |
| --- | --- |
| 10×A[W]+A[W+1]+Z◢:<br>0→U | Display result.<br>Clear exact flag and then return to calling program. |

It is noted that the examples given above use data and information from the game Panzer Leader to exemplify the disclosure. It will be seen that identical or similar methods and apparatus can be used with respect to other games as well.

While the subject matter has been illustrated and described in detail in the drawings and foregoing description, the same is to be considered as illustrative and not restrictive in character, it being understood that only preferred embodiment(s) have been shown and described and that all changes and modifications that come within the spirit of the disclosure are desired to be protected.

What is claimed is:

1. An apparatus comprising:
a programmable device having a processor electronically linked to programmable memory, a display and an input;
said memory having stored therein an array of data reflecting a set of odds-values used in determining an outcome between a first side having a first strength value and a second side having a second strength value in a game;
said memory further having storage for accepting a first inputted number as said first strength value and a second inputted number as a second strength value;
said memory further having stored therein a set of instructions callable by said processor, said instructions including determining whether the ratio of the first strength value to the second strength value is between a relatively higher odds-value and a relatively lower odds-value of the set of odds-values, determining a closeness factor reflecting the closeness of the ratio of the first strength value to the second strength value to one of said two odds-values, and outputting to said display one of said two odds-values.

2. The apparatus of claim 1, wherein said odds-value outputted to the display is part of a decimal probability indicator, said probability indicator having no fewer than two digits to the left of the decimal indicating said odds-value, and a plurality of digits to the right of the decimal indicating a set of values for comparison to respective random numbers, wherein if a random number is less than a respective digit in the set of values, said one of said two odds-values outputted to the display is used in the game to determine the outcome, and if a random number is greater than a respective digit in the set of values the other of said two odds-values is used in the game to determine the outcome, and if a random number is equal to a respective digit in the set of values then a new random number is compared to the next digit in the set of values; and wherein said instructions also include calculations to determine said decimal probability indicator.

3. The apparatus of claim 1, wherein said instructions also include generation of a random number by said processor and comparing said random number to said closeness factor, wherein when said random number is less than said closeness factor, said relatively higher odds-value is the outputted odds-value, and when said random number is greater than said closeness factor, said relatively lower odds-value is the outputted odds-value.

4. The apparatus of claim 1, wherein said instructions include testing said ratio to see if it is above the largest of the set of odds-values, below the smallest of the set of odds-values, or equal to an odds-value in the set of odds-values.

5. The apparatus of claim 1, wherein said memory includes set storage that retains a running total of one or more said closeness factors previously determined, wherein when said total exceeds unity, said relatively higher odds-value is outputted, and if said total is less than unity, said relatively lower odds-value is outputted.

6. A method of calculating an outcome between a first side and a second side in a game in which an odds table including a set of discrete odds-values is provided for such outcome, comprising:
determining a strength value for said first side and a strength value for said second side;
finding a particular one of said odds-values using said strength values, wherein if the ratio of the strength values is equivalent to an odds-value in the odds table, said finding includes choosing the odds-value equivalent to said ratio as the particular odds-value, and if said ratio is numerically between a greater and lesser of the odds-values, said finding includes generating a random number wherein when the random number is less than the closeness factor the greater odds-value is the particular one of said odds-values, and when the random number is greater than the closeness factor the lesser odds-value is the particular one of said odds-values.

7. The method of claim 6, wherein said finding is performed by a programmable device having a processor electronically linked to memory, and further comprising inputting said strength values to said memory.

8. The method of claim 7, wherein said inputting is performed manually.

9. The method of claim 7, wherein said memory is pre-programmed with an array of data reflecting the set of discrete odds-values.

10. The method of claim 7, further comprising using the odds-value that has been indicated for use in the game to determine an outcome.

11. The method of claim 7, wherein said processor is electronically connected to a display, and further comprising outputting said particular odds-value to said display.

12. A method of calculating an outcome between a first side and a second side in a game in which an odds table including a set of discrete odds-values is provided for such outcome, comprising:
inputting a first strength value representing said first side and a second strength value representing said second side into a programmable memory, said programmable memory electronically connected to a display and a processor;
using said processor to calculate a third value from said first and second strength values, said third value representing one of said odds-values from said odds table and a set of probability factors, and
displaying said third value on said display.

13. The method of claim 12, wherein said memory is preprogrammed with an array representing said discrete odds-values.

14. The method of claim 12, wherein said third value is a decimal having no fewer than two digits to the left of the decimal that are the representation of the one of said odds-values from said odds table, and having a plurality of digits to the right of the decimal that are the set of probability factors.

15. The method of claim 13, wherein there is a second odds-value higher than the one of said odds-values from said odds table, and further comprising obtaining a random number and comparing said random number to the first digit to the right of the decimal, wherein if said random number is less than said first digit then the one of said odds-values from said odds table is chosen for use in calculating the outcome, if said random number is greater than said first digit then said second odds-value is chosen for use in calculating the outcome, and if said random number is equal to said first digit, then a new random number is generated and compared in the same way to the next of said digits to the right of the decimal, said obtaining and comparing being repeated until one of said one odds-value and said second odds-value is chosen.

16. The method of claim 14, wherein said plurality of digits to the right of the decimal each have values of a predetermined magnitude, and said obtaining a random number includes rolling a die having a number of sides equal that predetermined magnitude.

17. The method of claim 16, wherein said predetermined magnitude is 6.

18. The method of claim 12, wherein said using includes testing said first and second strength values to see if the ratio between them is equal to one of said odds-values, and if so, said third value is a number of no fewer than two digits representing said one of said odds-values.

19. A method of calculating an outcome between a first participant and a second participant in a game in which an odds table including a set of discrete odds-values is provided for such outcome, comprising:

inputting a set of values identified with at least a first participant into a programmable memory, said set including a first strength value representing said first participant and a second strength value representing said second participant, said programmable memory electronically connected to a display and a processor and including one or more dedicated memory locations for each participant that includes information relating to past calculations for the respective participant;

using said processor to compute a third value from said first and second strength values, said odds-values and said information in said dedicated memory locations, and displaying the proper odds-value on said display.

20. The method of claim 18, wherein said memory is preprogrammed with an array corresponding to said discrete odds-values.

* * * * *